2,875,078

SPINNING OF VISCOSE

Byron N. Baer, Newark, and John D. Brandner and John W. Le Maistre, Wilmington, Del., assignors to Atlas Powder Company, Wilmington, Del., a corporation of Delaware No Drawing. Application August 22, 1955
Serial No. 529,951

7 Claims. (Cl. 106—165)

This invention relates to the regeneration of cellulose from viscose solutions and more particularly to the manufacture of regenerated cellulose articles such as yarn and film from viscose.

It is an object of the invention to provide a process for producing high-tenacity regenerated cellulose yarn having novel and desirable properties.

Another object of the invention is to provide a process for producing high-tenacity regenerated cellulose yarn.

A further object is to provide a process whereby unripened viscose can be spun to produce a high-tenacity, fatigue resistant regenerated cellulose fiber having improved soil and abrasion resistance.

A still further object is to provide novel viscose compositions adapted to the spinning of high-tenacity regenerated cellulose yarns.

The above and other objects will become more apparent in the course of the following description of the invention and in the appended claims.

The above objects are accomplished in accordance with the invention by incorporating in the viscose solution to be spun a compound conforming to the generic formula $$R\text{---}O(C_2H_4O)_x\text{---}CH_2CH_2CH_2NH_2$$

wherein R is an alkyl radical containing from 12 to 20 carbon atoms and $x$ has any value from 6 to 30. An exemplary list of compounds so defined includes aminopropyl ether of octadecaoxyethylene ether of oleyl alcohol, aminopropyl ether of decaoxyethylene ether of (oxo) tridecyl alcohol, aminopropyl ether of octadecaoxyethylene ether of stearyl alcohol, aminopropyl ether of pentadecaoxyethylene ether of arachidic alcohol, aminopropyl ether of pentacosaoxyethylene ether of arachidic alcohol.

The defined compounds useful in the practice of this invention are made in the following manner. A monohydric alcohol is condensed with ethylene oxide yielding glycol ether of the alcohol which is further reacted with acrylonitrile forming a cyano ethyl ether which can be catalytically reduced to the aminopropyl ether of the oxyethylene ether of the alcohol. By way of illustration, the preparation of three aminopropyl ether of eicosaoxyethylene ether of oleyl alcohol is described in the following example:

Example I

To a solution of 76 grams (0.073 mol) of eicosaoxyethylene ether of oleyl alcohol in 50 grams of dioxane was added 1.0 gram of sodium methoxide. The mixture was warmed to 65° C. in order to dissolve the sodium methoxide and then cooled and a total of 5.3 grams (0.1 mol) of acrylonitrile was added over a 17 minute period. The pot temperature rose from 16° C. to 19° C. during the addition. The mixture was stirred at room temperature for an additional 22 hours after which the reaction mixture was made acidic with dilute HCl then stripped to terminal conditions of 130° C. at 8 mm. Hg. To the pot residue was added 20 ml. of absolute ethanol and the sodium chloride was removed by filtration. After removing the ethanol by stripping at reduced pressure the β-cyanoethyl ether of eicosaoxyethylene ether of oleyl alcohol was collected as the pot residue.

Reduction of β-cyanoethyl ether of eicosaoxyethylene ether of oleyl alcohol was carried out in a rocking autoclave using a nickel on kieselguhr catalyst (1% Ni based on cyanoethylated product charged) and an equal volume of absolute ethanol as a diluent. Maximum conditions were 890 $H_2$ p. s. i. g. at 107° C. Reduction time was 5 hours. After filtering off the catalyst and stripping of the alcohol the amino product was collected as the pot residue and analyzed 0.87% nitrogen.

The defined compounds are soluble in viscose solutions and may be incorporated therein at any stage of the viscose process after the cellulose is dissolved. For effective results, from about 0.5% to about 4.0% by weight based on the weight of the cellulose of the aminopropyl ethers as above defined is employed. The composition of the viscose may vary widely as is known in the art. It may be formed from cotton linters or from wood pulp as the source of cellulose, and may contain from 4% to 10% of cellulose in a solution containing from 4% to 8% of alkali metal hydroxide. The amount of carbon disulfide used in xanthation may be from 25% to 50%.

The viscose solutions of the invention, i. e., those containing the aminopropyl ethers hereinbefore defined, may be employed in the normal manner for the production of regenerated cellulose films and yarns. Suitable spinning or regenerating baths contain sulfuric acid, zinc sulfate and sodium sulfate. Preferred spinning baths contain from 4% to 12% sulfuric acid, from 1% to 10% zinc sulfate and 13% to 25% sodium sulfate.

The following non-limiting example illustrates the preparation of a viscose solution and production of regenerated cellulose yarn therefrom, in accordance with the invention.

Example II

A cotton linters viscose containing 7% cellulose and 6.6% sodium hydroxide is prepared in the conventional manner except that during the dissolution of the exanthated cellulose in aqueous sodium hydroxide, 1% by weight of the gamma-aminopropyl ether of octadecaoxyethylene ether of oleyl alcohol is added and thoroughly dispersed therein. The resultant viscose solution is spun in an unripened state (high salt index of 7) into a bath of 8% sulfuric acid, 8% zinc sulfate and 20% sodium sulfate. The spinning is carried out on conventional equipment to produce regenerated cellulose yarn of high tensile strength resistant to flexing and abrasion of especial benefit as a tire yarn.

Example III

A viscose containing 7% cellulose and 6% sodium hydroxide is modified by the addition of 1.5% gamma-aminopropyl ether of octaoxyethylene ether of lauryl alcohol. The modified viscose solution is spun on conventional equipment into a bath of 8% sulfuric acid, 8% zinc sulfate and 20% sodium sulfate. Yarn of smooth surface and high tensile strength resistant to soiling results.

What is claimed is:

1. Viscose containing from 0.5% to 4%, based on the weight of the cellulose content of the viscose, of a compound conforming to the generic formula $$R\text{---}O(C_2H_4O)_x\text{---}CH_2CH_2CH_2NH_2$$

wherein R is an alkyl radical containing from 12 to 20 carbon atoms and $x$ has any value from 6 to 30.

2. Viscose containing from 0.5% to 4%, based on the cellulose content of the viscose, of the gamma-aminopropyl ether having the formula $$C_{18}H_{35}O(C_2H_4O)_{18}CH_2CH_2CH_2NH_2$$

3. Viscose containing from 0.5% to 4%, based on the cellulose content of the viscose of the gamma-aminopropyl ether having the formula $$C_{12}H_{25}O(C_2H_4O)_8CH_2CH_2CH_2NH_2$$

4. Viscose containing from 0.5% to 4%, based on the cellulose content of the viscose, of the gamma-aminopropyl ether having the formula $$C_{18}H_{37}O(C_2H_4O)_{24}CH_2CH_2CH_2NH_2$$

5. A viscose spinning solution comprising from 4% to 10% cellulose, from 4% to 8% alkali metal hydroxide and from 0.5% to 4%, based on the weight of the cellulose, of a compound conforming to the generic formula $$R-O(C_2H_4O)_x-CH_2CH_2CH_2NH_2$$

wherein R is an alkyl radical containing from 12 to 20 carbon atoms and $x$ has any value from 6 to 30.

6. A method of producing regenerated cellulosic structures which comprises spinning a viscose solution containing from 4% to 10% cellulose, from 4% to 8% alkali metal hydroxide and from 0.5% to 4%, based on the weight of the cellulose, of a compound conforming to the generic formula $$R-O(C_2H_4O)_x-CH_2CH_2CH_2NH_2$$

wherein R is an alkyl radical containing from 12 to 20 carbon atoms and $x$ has any value from 6 to 30.

7. In the spinning of regenerated cellulosic yarns from viscose the improvements which comprises dissolving in the viscose solution from 0.5% to 4%, based on the weight of the cellulose of a compound conforming to the generic formula $$R-O(C_2H_4O)_x-CH_2CH_2CH_2NH_2$$

wherein R is an alkyl radical containing from 12 to 20 carbon atoms and $x$ has any value from 6 to 30.

References Cited in the file of this patent

UNITED STATES PATENTS

| | | |
|---|---|---|
| 2,481,692 | Schlosser et al. | Sept. 13, 1949 |
| 2,593,466 | MacLaurin | Apr. 22, 1952 |
| 2,732,279 | Tachikawa | Jan. 24, 1956 |
| 2,775,505 | Pedlow | Dec. 25, 1956 |
| 2,777,775 | Edwards | Jan. 15, 1957 |